July 8, 1930.  H. M. HARDY  1,770,034
METALLIC PISTON PACKING
Filed Jan. 30, 1928   2 Sheets-Sheet 1
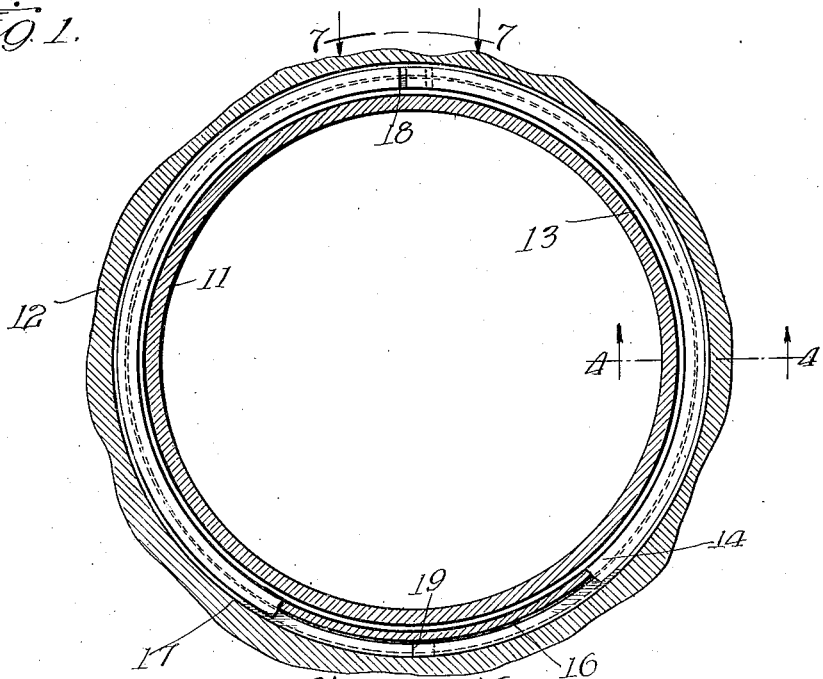
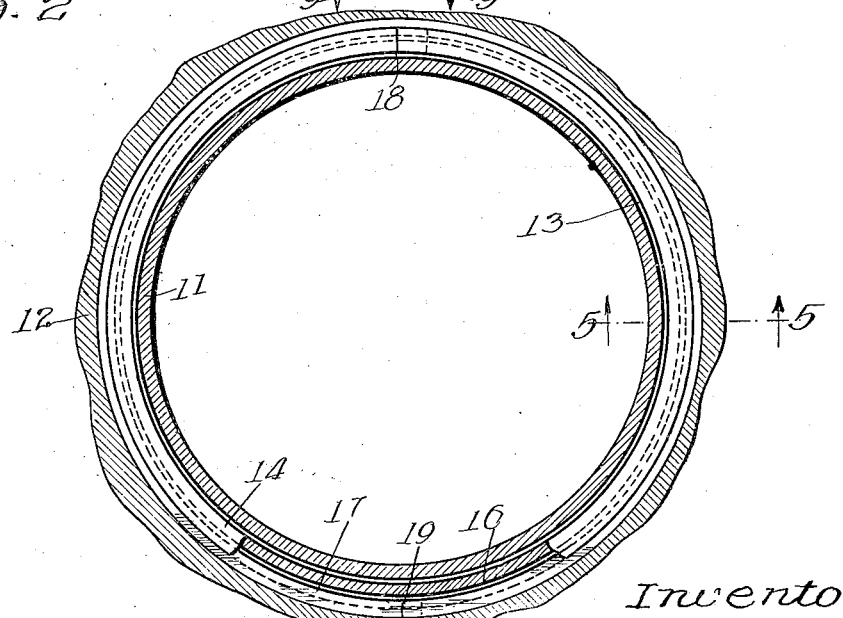
Inventor
Hazlett M. Hardy
By Fisher, Towle, Clapp & Soans
Attys.

July 8, 1930. H. M. HARDY 1,770,034
METALLIC PISTON PACKING
Filed Jan. 30, 1928 2 Sheets-Sheet 2
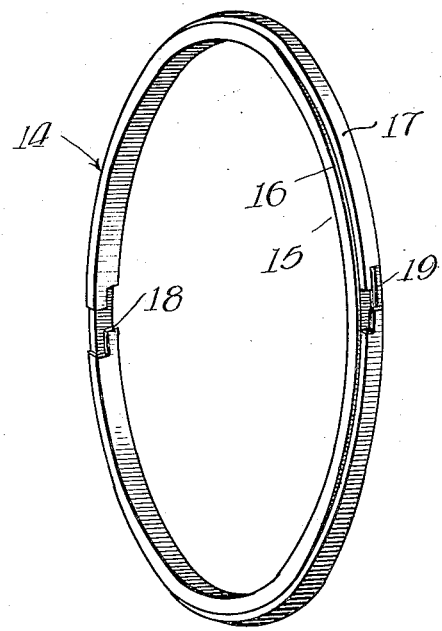
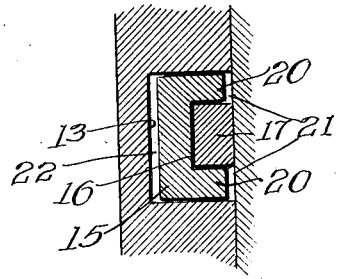
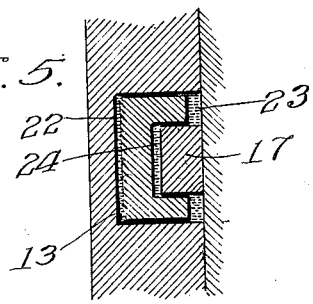
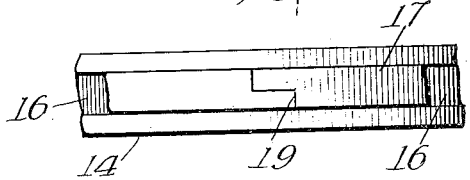
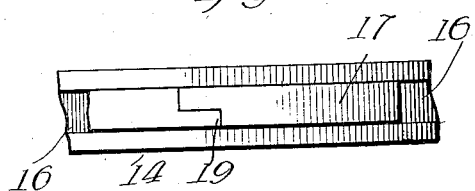
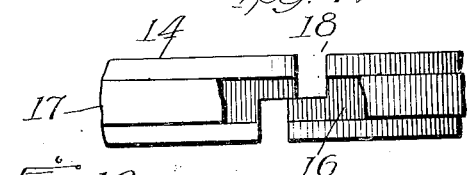
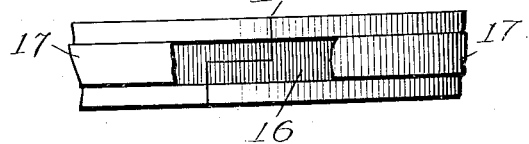
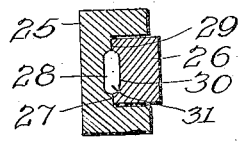
Inventor
Hazlett M. Hardy.
By Fisher, Towle, Clapp & Soans
Attys Patented July 8, 1930

1,770,034

UNITED STATES PATENT OFFICE

HAZLETT M. HARDY, OF MUSKEGON, MICHIGAN

METALLIC PISTON PACKING

Application filed January 30, 1928. Serial No. 250,525.

The invention relates to metallic spring packing rings for pistons and seeks to provide an improved metallic packing of the multiple ring type, in which the cylinder lubricating oil and the pressures to which the packing is subjected are effectively utilized to maintain or aid in maintaining a tight joint between the piston and the cylinder wall.

With these and other objects in view the improved packing comprises inner and outer metallic rings of the split, radially expansible type, the inner ring being arranged to fit snugly in the piston groove and the outer ring to bear upon the cylinder wall, and the rings are so constructed that, when compressed to circular form with the gaps therein closed or substantially so, the external diameter of the outer bearing ring is substantially greater than that of the inner carrier ring, and the internal diameter of the bearing ring substantially exceeds the least external diameter of the carrier ring. With the improved construction, one or two annular grooves or oil-collecting chambers are provided at the outer portion of the piston groove and outside the periphery of the inner carrier ring and an annular passage or passages lead therefrom into the space between the rings, and such space provides a chamber in which fluid pressure is built up or accumulated, when the packing is subjected to pressure, to thereby contract or compress the inner carrier ring to closure and force the outer bearing ring against the cylinder wall.

Other features of the present invention are hereinafter more fully set forth, are illustrated in the preferred form in the accompanying drawings and are more particularly pointed out in the appended claims.

In the drawings:

Fig. 1 is a transverse section taken through the piston groove and a portion of the cylinder wall and showing the improved metallic packing in plan with a portion of the inner carrier ring in section, the parts of the packing being shown in the position assumed when not subject to pressure.

Fig. 2 is a view similar to Fig. 1, but showing the parts of the packing in the position occupied when under pressure.

Fig. 3 is a perspective view of the improved multiple packing ring in the condition assumed by the parts when removed from the piston.

Figs. 4 and 5 are enlarged sections on the lines 4—4 and 5—5 respectively of Figs. 1 and 2.

Fig. 6 is a partial side view of the improved packing indicated by the arrows 6—6 of Fig. 1.

Fig. 7 is a partial elevation indicated by the arrows 7—7 of Fig. 1, with the outer bearing ring broken away.

Figs. 8 and 9 are views similar to Figs. 6 and 7 respectively, except that the parts are shown in the condition assumed when the packing is under pressure, the direction in which these views are taken being indicated by the arrows 8—8 and 9—9 of Fig. 2.

Fig. 10 is a cross section of a slight modification of the improved composite packing ring.

In the drawings, portions of the piston and cylinder walls 11 and 12 are shown in Figs. 1, 2, 3 and 4. The piston is provided as usual with a number of grooves 13 for receiving metallic packing, the side walls of the grooves being, as usual, at right angles to the axis of the piston and cylinder. The present improved metallic packing 14 comprises inner and outer rings 15 and 17 of the split, radially expansible type. The inner ring, like the ordinary packing ring, snugly fits the side walls of the piston groove, but has, as shown, a radial thickness substantially less than the depth of the groove, and in its preferred form is provided with a peripheral groove 16 in its outer face within which the outer ring 17 is disposed. The rings are each split on one side, preferably by step joints as indicated at 18 and 19 respectively. The rings are formed of suitable spring metal, preferably cast iron, and normally tend to expand and separate the split ends as shown in Fig. 3. As usual, when expanded, the rings are somewhat eccentric, but assume circular form when compressed to close their gaps and bring their ends into contact or substantially so.

The inner carrier ring has its annular channel or groove 16 centrally located between its sides and thereby provides outwardly projecting flanges 20. As stated, the radial thickness of the inner carrier ring is less than the depth of the piston groove, and preferably also, the outer bearing ring 17 has a radial depth somewhat greater than the depth of the groove 16 in which it is seated. Also, the construction is such that when both rings are compressed to circular form with their ends in contact or substantially so, the external diameter of the outer bearing ring is greater than the largest external diameter of the inner carrier ring, and the internal diameter of the outer bearing ring exceeds the least external diameter of the carrier ring measured at the base of the groove 16.

When installed on a piston within a cylinder, the engagement of the cylinder walls with the outer bearing ring will compress the latter to circular form with its ends in contact or substantially so, as shown in Figs. 1 and 6, but the inner carrier ring will be expanded to the extent permitted by its engagement with the outer bearing ring and its ends will be spaced apart as indicated in Figs. 1 and 7. In this condition the outer bearing ring will be pressed into engagement with the cylinder wall by its own tendency to expand and also by the pressure against it of the inner carrier ring, but since the latter is somewhat eccentric, that is to say is not compressed to circular form, and since the outer bearing ring preferably has a radial thickness greater than that of the depth of the groove 16, annular chambers 21 (see Fig. 4) will be formed on opposite sides of the outer portion of the bearing ring and at the outer portion of the piston groove in which oil, scraped from the cylinder wall by the bearing ring 17, will accumulate or collect and serve to lubricate the cylinder wall and also afford an oil seal to prevent leaking between the bearing ring and the cylinder wall.

The outer bearing ring 17 fits somewhat loosely within the groove 16 of the inner carrier ring so that, when the packing is subjected to pressure, a path of least resistance will be provided for the flow of oil or fluid under pressure from one of the annular grooves or chambers 21 into the space between the rings, and, since at the same time the outer bearing ring will be forced snugly into engagement with one of the flanges 20 of the inner ring, fluid pressure will accumulate or be built up in the chamber between the rings to thereby contract or compress the inner ring to circular form with its ends in contact and exert pressure on the outer bearing ring to force it firmly against the cylinder wall. Thus, when the packing is subjected to pressure, the annular grooves or chambers 21 (see Fig. 4) and the intermediate space or chamber between the rings will be enlarged, as indicated at 23 and 24 in Fig. 5, whereas the annular chamber 22 between the inner surface of the carrier ring 15 and the bottom of the piston groove will be reduced. When the piston and its packing are relieved from pressure, the oil forced into the annular chamber 24 will be forced therefrom between the rings by the expansion of the inner carrier ring.

The improved composite packing ring thus serves to aid in lubricating the cylinder wall and utilizes the lubricating oil and the fluid pressure to which the piston and packing are subjected to maintain or aid in maintaining a tight joint between the bearing ring and the cylinder wall, and while applicable to pistons used for many purposes, it can be used to particular advantage upon the pistons of internal combustion engines. In such engines, during the suction and exhaust strokes, there is little pressure upon the packing and the outer bearing ring will be held in engagement with the cylinder wall by its own resiliency and also by that of the inner carrier ring which will engage the inner surface of the inner ring throughout a portion at least of its periphery. During the compression and working strokes, the applied pressure as stated, will force the outer bearing ring snugly into engagement with the lower flange of the inner carrier ring and oil under pressure will pass through the annular space between the bearing ring and the upper flange of the carrier ring into the chamber between the rings, so that fluid pressure will build up or accumulate in the chamber 24, as stated, to thereby contract the inner carrier ring to closure and force the outer bearing ring firmly into engagement with the cylinder wall. Also, as stated, when the pressure is relieved, oil will flow outwardly from the chamber 24 and permit the expansion of the inner carrier ring. One feature of advantage is that the expansion and contraction of the inner carrier ring will keep the radial contacting faces of the inner and outer rings and of the piston groove smooth and bright and so prevent the gumming of lubricant on such faces and the sticking of the packing. Also, since the accumulation of fluid pressure is relied upon to maintain tight joints when the packing is subjected to pressure, the rings can be lighter in weight and have less expansive tendency than is ordinarily the case, and the use of the improved ring not only effects a marked improvement in efficiency but also a decided saving in wear upon the piston, cylinder and packing.

The modification shown in Fig. 10 comprises an inner carrier ring 25 and an outer bearing ring 26, the carrier ring having an external peripheral groove 27 which receives the bearing ring. The bottom wall of the carrier ring groove 27 is provided with a continuous annular recess 28, and the opposed inner surface of the outer bearing ring is provided with a corresponding annular recess 30. When the bearing ring is compressed and the carrier ring expanded, the opposed faces of the rings contact at points 29. Otherwise the construction is similar to that already shown and described and in a like manner provides annular oil collecting chambers and an inner annular chamber 31 in which fluid pressure accumulates, when the packing is subjected to pressure, to contract the inner ring and force the outer bearing ring against the cylinder wall.

Changes may be made in the details set forth without departure from the scope of the appended claims.

I claim as my invention:

1. A metallic piston packing comprising an expansible split carrier ring having a peripheral groove disposed between outwardly projecting flanges, and an expansible split bearing ring fitting loosely between the flanges of the carrier ring, the bearing ring, when both rings are substantially closed, having an external diameter substantially exceeding that of the carrier ring flanges, and having an internal diameter substantially greater than the root diameter of the carrier ring groove, substantially as described.

2. A metallic piston packing comprising an imperforate, expansible, split carrier ring having a peripheral groove disposed between outwardly projecting flanges, and an expansible split bearing ring supported between the carrier ring flanges and projecting substantially outside of said flanges, when both rings are closed, to form circumferential oil collecting chambers, and said rings being adapted to permit the flow of fluid into the carrier ring groove, substantially throughout the periphery thereof, and to provide a circumferential chamber at the inner portion of said groove for receiving fluid under pressure to thereby contract the inner carrier ring and force the outer bearing ring against the cylinder wall, substantially as described.

3. A compression and oil control piston ring comprising an imperforate carrier ring grooved about its circumference and split on one side with flanged portions turned outwardly from the axis thereof, and a bearing ring likewise split on one side supported by the flanged portions of the carrier ring, the least external diameter of the carrier ring when brought to a closure being less than the internal diameter of the bearing ring when it is brought to a closure, to thereby provide a chamber between the two rings when both rings are closed at their respective gaps.

4. In combination, a cylinder, a grooved piston therein, expansible, split carrier and bearing rings, the carrier ring snugly fitting between the radial walls of the piston groove but having a radial thickness less than the depth of such groove, said carrier ring having a peripheral groove disposed between outwardly projecting flanges and within which said bearing ring loosely fits, the bearing ring having a radial thickness greater than the depth of the carrier ring groove and said rings, when compressed, providing a chamber at the inner portion of said groove for receiving fluid under pressure to thereby contract the carrier ring and press the bearing ring against the cylinder wall, substantially as described.

5. A metallic piston packing comprising an inner, imperforate, expansible, split ring having a circumferential groove in its outer face, and an outer expansible, split ring disposed in the groove of the inner ring, said packing rings being arranged, in functional operation, to permit the flow of fluid under pressure into said groove substantially throughout the periphery thereof and to provide a chamber at the inner portion of the groove and between the rings in which fluid pressure is built up to contract the inner ring and force the outer ring against the cylinder wall, substantially as described.

6. A metallic piston packing comprising an inner, imperforate, split, expansible ring, adapted to snugly fit the side walls of the piston groove and having a circumferential groove in its outer face and an outer, split, expansible ring adapted to bear on the cylinder wall, the opposed circumferential walls of said rings being spaced apart when the rings are compressed, to provide a fluid pressure chamber and said outer ring loosely fitting the groove of the inner ring to permit the flow of fluid into and out of said chamber to build up and relieve pressure therein and thereby contract and permit the expansion of the inner ring and force the outer ring against the cylinder wall when the packing is under pressure, substantially as described.

7. A metallic piston packing comprising an inner, split, expansible ring adapted to snugly fit the piston groove, a relatively narrower, outer, imperforate, split, expansible ring arranged to bear on the cylinder wall, said rings, when closed, having their opposed circumferential faces spaced apart with the outer ring projecting substantially beyond the periphery of the inner ring to thereby form, when in functional operation, an outer, circumferential oil collecting chamber, an inner, circumferential fluid pressure chamber between the rings, and a circumferential passage affording communication between said chambers, substantially as described.

8. In combination, a cylinder, a grooved piston therein and a metallic piston packing comprising an inner, imperforate, radially expansible carrier ring snugly fitting the side walls of the piston groove and free to expand and contract therein, an outer, relatively narrower bearing ring engaging the cylinder wall, said rings, when compressed to circular form, having their opposed circumferential faces substantially spaced apart to provide a fluid pressure chamber between the rings, and said bearing ring projecting beyond the periphery of the inner ring and providing an annular oil collecting chamber and an annular passage between said chambers, whereby, in operation, the bearing ring is pressed into engagement with the cylinder wall by the carrier ring, when the packing is free from pressure, and by fluid pressure built up in the chamber between the rings, when the packing is under pressure, substantially as described.

HAZLETT M. HARDY.